(12) United States Patent
Hundal et al.

(10) Patent No.: US 7,693,488 B2
(45) Date of Patent: *Apr. 6, 2010

(54) SYSTEM AND METHOD FOR ASYMMETRIC ENHANCED MODE OPERATION IN A DIGITAL COMMUNICATION SYSTEM

(75) Inventors: Sukhdeep S. Hundal, British Columbia (CA); Milosh Koprivica, British Columbia (CA)

(73) Assignee: VTech Telecommunications Limited, Tai Po, New Territory (HK)

( * ) Notice: Subject to any disclaimer, the term of this patent is extended or adjusted under 35 U.S.C. 154(b) by 433 days.

This patent is subject to a terminal disclaimer.

(21) Appl. No.: 10/952,734

(22) Filed: Sep. 30, 2004

(65) Prior Publication Data

US 2006/0068715 A1    Mar. 30, 2006

(51) Int. Cl.
*H04B 1/00* (2006.01)
*H04B 17/00* (2006.01)

(52) U.S. Cl. .................. 455/63.1; 455/67.13; 370/337; 370/345; 375/296; 375/346

(58) Field of Classification Search .............. 455/67.11, 455/67.13, 68, 59, 101, 63.1, 69; 375/130, 375/132, 220, 227, 242, 254, 346, 296; 370/330, 370/331, 343, 447, 337, 345, 442
See application file for complete search history.

(56) References Cited

U.S. PATENT DOCUMENTS

| | | |
|---|---|---|
| 3,697,782 A | 10/1972 | Matouka |
| 3,838,395 A | 9/1974 | Suttill, Jr. et al. |
| 4,193,030 A | 3/1980 | Rabow et al. |
| 4,353,065 A | 10/1982 | Mori |
| 4,355,399 A | 10/1982 | Timor |
| 4,479,125 A | 10/1984 | Mori |

(Continued)

FOREIGN PATENT DOCUMENTS

DE    44 07 544    9/1995

(Continued)

OTHER PUBLICATIONS

German office action dated Mar. 23, 2004.

(Continued)

*Primary Examiner*—Quochien B Vuong
(74) *Attorney, Agent, or Firm*—Paul, Hastings, Janofsky & Walker LLP

(57) ABSTRACT

A method for reducing interference from a wireless communications system. The interference threshold is set based on a quality criterion that can be measured during operation of the system. The quality criterion is measured during system operation. Preferably, a separate quality criterion measurement is performed for each of an uplink and a downlink of the wireless communications system. The quality criterion is compared to the information containing the set interference threshold. A breach of the interference threshold for the uplink or the downlink is determined when the measurement indicates that the measured quality criterion is sufficiently poor that operation of the system should be modified. Upon determination of an interference breach in either the uplink or downlink, the system initiates an asymmetric enhanced mode operation in which redundant data transmission is established over the link exhibiting the interference breach, while standard, non-redundant transmission continues on the other link.

17 Claims, 11 Drawing Sheets

U.S. PATENT DOCUMENTS

| | | | |
|---|---|---|---|
| 4,529,980 A | 7/1985 | Liontine et al. | |
| 4,558,453 A | 12/1985 | Mimken | |
| 4,606,040 A | 8/1986 | David et al. | |
| 4,663,623 A | 5/1987 | Lax et al. | |
| 4,663,765 A | 5/1987 | Sutphin et al. | |
| 4,740,962 A | 4/1988 | Kish, III | |
| 4,745,408 A | 5/1988 | Nagata et al. | |
| 4,746,870 A | 5/1988 | Underhill | |
| 4,763,339 A | 8/1988 | Sutphin et al. | |
| 4,783,654 A | 11/1988 | Ichikawa | |
| 4,937,822 A | 6/1990 | Weddle et al. | |
| 5,029,180 A | 7/1991 | Cowart | |
| 4,286,334 A | 8/1991 | Gammel et al. | |
| 5,044,010 A * | 8/1991 | Frenkiel et al. | 455/464 |
| 5,144,668 A | 9/1992 | Malek et al. | |
| 5,285,443 A | 2/1994 | Patsiokas et al. | |
| 5,297,203 A | 3/1994 | Rose et al. | |
| 5,303,260 A | 4/1994 | Fonnesbeck et al. | |
| 5,307,371 A | 4/1994 | Juola | |
| 5,323,447 A | 6/1994 | Gillis et al. | |
| 5,339,331 A | 8/1994 | Beauchamp et al. | |
| 5,345,600 A | 9/1994 | Davidson | |
| 5,371,734 A | 12/1994 | Fischer | |
| 5,371,783 A | 12/1994 | Rose et al. | |
| 5,390,166 A * | 2/1995 | Rohani et al. | 370/335 |
| 5,400,369 A | 3/1995 | Ikemura | |
| 5,406,613 A | 4/1995 | Peponides et al. | |
| 5,436,906 A * | 7/1995 | Kasuya et al. | 370/347 |
| 5,471,071 A | 11/1995 | Yoshihara | |
| 5,504,750 A | 4/1996 | Fulghum et al. | |
| 5,528,621 A | 6/1996 | Heiman et al. | |
| 5,541,954 A | 7/1996 | Emi | |
| 5,574,979 A | 11/1996 | West | |
| 5,600,629 A | 2/1997 | Van Daele et al. | |
| 5,640,415 A | 6/1997 | Pandula | |
| 5,642,365 A | 6/1997 | Murakami et al. | |
| 5,661,764 A | 8/1997 | Nakajima | |
| 5,694,438 A | 12/1997 | Wang et al. | |
| 5,737,359 A | 4/1998 | Koivu | |
| 5,809,059 A | 9/1998 | Souissi et al. | |
| 5,848,095 A | 12/1998 | Deutsch | |
| 5,857,147 A | 1/1999 | Gardner et al. | |
| 5,870,391 A | 2/1999 | Nago | |
| 5,917,812 A | 6/1999 | Antonio et al. | |
| 5,918,169 A | 6/1999 | Dent | |
| 5,956,377 A | 9/1999 | Lang | |
| 6,006,071 A | 12/1999 | Roberts et al. | |
| 6,115,407 A | 9/2000 | Gendel et al. | |
| 6,229,432 B1 | 5/2001 | Fridley et al. | |
| 6,229,796 B1 | 5/2001 | Dent | |
| 6,252,464 B1 | 6/2001 | Richards et al. | |
| 6,275,517 B1 | 8/2001 | Izumi | |
| 6,316,758 B1 | 11/2001 | Ubowski et al. | |
| 6,434,183 B1 | 8/2002 | Kockmann et al. | |
| 6,470,042 B1 | 10/2002 | Tuni et al. | |
| 6,490,262 B1 | 12/2002 | Hogger | |
| 6,532,223 B1 | 3/2003 | Skoda et al. | |
| 6,549,784 B1 | 4/2003 | Kostic et al. | |
| 6,587,498 B1 | 7/2003 | Sarkola | |
| 6,668,328 B1 | 12/2003 | Bell | |
| 6,671,309 B1 | 12/2003 | Craig et al. | |
| 6,850,740 B1 * | 2/2005 | Haartsen | 455/101 |
| 6,928,303 B2 * | 8/2005 | Sydon et al. | 455/561 |
| 6,967,943 B1 | 11/2005 | Hamalainen et al. | |
| 7,054,296 B1 | 5/2006 | Sorrells et al. | |
| 7,266,141 B2 | 9/2007 | Goodings | |
| 7,359,343 B2 | 4/2008 | Goodings | |
| 2002/0126692 A1 | 9/2002 | Haartsen | |
| 2003/0104780 A1 * | 6/2003 | Young | 455/7 |
| 2005/0124298 A1 | 6/2005 | Carlson et al. | |
| 2006/0120333 A1 | 6/2006 | Horvat et al. | |

FOREIGN PATENT DOCUMENTS

| | | |
|---|---|---|
| DE | 195 26 549 A1 | 2/1996 |
| DE | 195 37 361 | 4/1997 |
| EP | 0 097 579 | 1/1984 |
| EP | 0182762 | 5/1986 |
| EP | 0622918 | 11/1994 |
| EP | 0767550 | 4/1997 |
| EP | 0935347 | 8/1999 |
| GB | 2 228 163 | 8/1990 |
| GB | 2 239 768 | 7/1991 |
| GB | 2 261 141 | 5/1993 |
| GB | 2 277 231 | 10/1994 |
| GB | 2277231 | 10/1994 |
| GB | 2 292 048 | 2/1996 |
| GB | 2 314 746 | 1/1998 |
| GB | 2 315 197 | 1/1998 |
| GB | 2 340 695 | 2/2000 |
| GB | 2340695 | 2/2000 |
| GB | 2 365 710 | 2/2002 |
| GB | 2 386 517 | 9/2003 |
| GB | 2 386517 | 9/2003 |
| JP | 2-179045 | 7/1990 |
| JP | 6177863 | 6/1994 |
| JP | 07297761 | 11/1995 |
| JP | 09200086 | 7/1997 |
| JP | 09298463 | 11/1997 |
| JP | 10093540 | 4/1998 |
| JP | 10178458 | 6/1998 |
| JP | 110112982 | 4/1999 |
| JP | 200216760 | 8/2000 |
| WO | WO 92/12481 | 7/1992 |
| WO | WO 95/08246 | 3/1995 |
| WO | WO 95/33320 | 12/1995 |
| WO | WO 95/34960 | 12/1995 |
| WO | WO 97/18639 | 5/1997 |
| WO | WO 98/04063 | 1/1998 |
| WO | WO 98/53559 | 11/1998 |
| WO | WO 99/38344 | 7/1999 |
| WO | WO 99/49587 | 10/1999 |
| WO | WO 00/51264 | 8/2000 |
| WO | WO 00/70811 | 11/2000 |
| WO | WO 00/74256 | 12/2000 |
| WO | WO 01/52466 | 7/2001 |
| WO | WO 01/73956 A2 | 10/2001 |
| WO | WO 01/97385 | 12/2001 |
| WO | WO/01/97385 | 12/2001 |

OTHER PUBLICATIONS

Bray et al. "Bluetooth Connect Without Cables" 41-61, 91-100, 191-217 (Prentice-Hall Inc, New Jersey, 2001).
Bluetooth Specification Version 1.0 B "Part B Baseband Specification," 56-69 (Bluetooth SIG, Inc., Nov. 29, 1999).
http://www.sysopt.com/articles/bluetooth/index2.html.
Harrtsen et al. "Bluetooth: Vision, Goals, and Architecture", Mobile Computing and Communications Review, vol. 1, No. 2, pp. 1-8.
German Office Action (dated Jun. 10, 2005).
German Office Action (dated Mar. 27, 2006).
Business Wire, "Siemens New Gigaset 2.4 GHZ Cordless Product Provides Unmatched Cordless Capabilities for Growing Multi-Cordless Market," Jan. 7, 1999 (http://www.thefreelibrary.com).

* cited by examiner

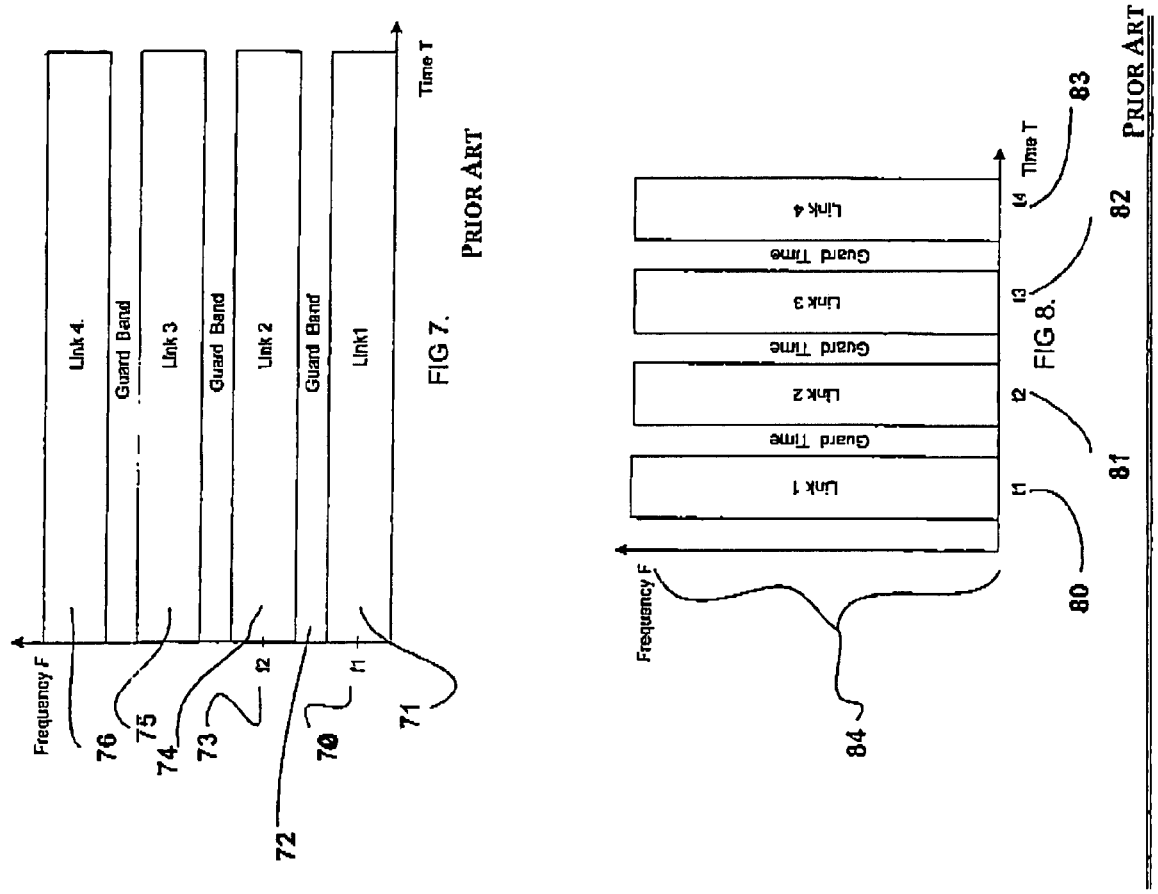

SYSTEM AND METHOD FOR ASYMMETRIC ENHANCED MODE OPERATION IN A DIGITAL COMMUNICATION SYSTEM

BACKGROUND

1. Field of the Invention

This invention relates generally to wireless digital communication systems. In particular, the invention discloses a technique for increasing the performance of a wireless communication link operating in the presence of an external source of intermittent interference.

2. Background

Cordless telephones have become increasingly popular in recent years. As improved technology is incorporated into cordless telephone designs, their sound quality and reliability have greatly improved, leading to the increasing proliferation and acceptance of cordless telephone devices in residential, and even commercial, environments.

However, as cordless telephones (which operate via a wireless radio frequency (RF) communication link established between the phone handset and a base unit) and other wireless devices have become more popular, the electromagnetic spectrum over which such devices communicate has, in turn, become increasingly crowded. Additionally, increasing numbers of other electronic devices are being used throughout society. Many such devices radiate electromagnetic energy that "pollutes" the spectrum over which wireless devices must communicate. As a result of these spurious transmissions and radiated noise, wireless devices commonly experience crosstalk and interference that inhibits the accurate and reliable transmission of signals.

In order to reduce the crowding of the electromagnetic spectrum designated for use by cordless telephones and other personal wireless devices, numerous frequency domain interference avoidance techniques, such as dynamic channel allocation, have been developed. Such techniques typically involve altering of the radio frequencies corresponding to the "channels" over which a wireless device communicates in an attempt to avoid externally generated radiated electromagnetic energy.

In devices that use dynamic channel allocation technique interference is detected by measuring quality criteria such as Received Signal Strength Indication "RSSI", packet, bit and synchronization errors. For a given channel, if RSSI, a number of synchronization, packet and/or bit loss errors are more then some specified threshold values, the channel will be qualified as bad. An algorithm implemented in the device will choose a new replacement channel and information about replacement of the channel will be communicated between link ends.

Also, additional frequency bands have been allocated for personal wireless communications devices, thereby spreading out device traffic and reducing the potential for interference.

Systems known in the art utilize many techniques to avoid the effects of RF interference that occur in a device's communication band. Many such techniques involve changing the system's frequency domain RF transmission characteristics. For example, calls may be handed off to a different carrier frequency, or noisy channels in the hopping pattern of a frequency hopping spread spectrum system may be substituted for different channels. Such channel substitution techniques are particularly effective in avoiding continuous narrowband sources of interference, such as may be generated by other cordless telephones.

A simple known multiple access system uses non-overlapping frequency bands for different communication links. Signals from two transceivers can be simultaneously transmitted without interfering with each other as presented in FIG. 7. User1 70 will occupy channel F1 71 spaced apart by using Guard Band 72 from channel F2 73 that is occupied by User2 74. Several users, User1 70, User2 74, User3 75 and User4 76 utilize a portion of frequency spectrum at the same time. In this method multiple access capabilities are achieved in the frequency domain and method is called Frequency Division Multiple Access "FDMA".

Similarly, instead of using different channels that are assigned to different users, signals can be transmitted at different time slots T1 80, T2 81, T3 82 and T4 83 in a round-robin fashion, as shown on FIG. 8. Signals from two transceivers will occupy same channel F 84 but will be separated based on time of arrival. Multiple access is achieved in the time domain, and the method is referred to as Time Division Multiple Access "TDMA".

The 2.4 GHz ISM band has become popular for use by cordless telephones and other wireless devices. Telephones operating in the 2.4 GHz ISM band commonly employ a communication protocol that is based on the Digital Enhanced Cordless Telecommunications ("DECT") standard, as defined in *European Telecommunications Standards Institute* (ETSI) standard ETS 300 175, September 1996 edition. Due to the characteristics and regulation of the 2.4 GHz band, devices operating thereon may offer increased range and/or bandwidth compared to other available frequency bands.

The DECT standard is being widely adopted throughout the world for wireless applications including cordless telephones, wireless offices and wireless telephone lines to the home. The DECT standard allows for multiple communication links, multiple accesses, between devices on a single RF carrier frequency through the use of time domain multiplexing. Following the success of DECT in Europe, Africa and South America, a variant of DECT has been developed for the North American market called Worldwide Digital Cordless Telecommunications ("WDCT"). The WDCT standard is currently becoming popular for use at the 2.4 GHz ISM band.

DECT utilizes a TDMA variant called Multi Carrier, Time Division Multiple Access, Time Division Duplex "MC/TDMA/TDD", as presented in FIG. 10. Ten channels are allocated from 1.880 GHz to 1.900 GHz. In the time domain, spectrum is subdivided into 10 ms wide TDMA frames 101 and 162. Each frame is divided in 24 sub-frames called "timeslots". Timeslots 103 and 104, which are spaced apart by 5 ms, can form one full duplex communication link, called a "bearer". The bearer shown has a downlink 105 that is associated with time slot 103, where the downlink direction is from a fixed part "FP" to a portable part "PP". A link direction from PP to FP that is associated with time slot 104, is called an uplink. The first 12 timeslots in one TDMA frame are used for downlink 105, while the rest of the slots are used for uplink 106.

There are three types of bearers used in standard DECT system: Dummy, Traffic and Connectionless bearer. "Dummy" 107 bearer is established in downlink direction to all PPs, and is used to keep all PPs synchronized with FP and to support continuous broadcast of signalling information to all users all the time. "Traffic" 108 bearer is a full duplex bearer between a PP and an FP. A primary use for a traffic bearer is to support voice or other user related information exchange between two link parties. Typically, in the DECT system, two bearers are established between PP and FP link parties that communicate by voice: a Dummy and a Traffic bearer. Each of the two bearers can be on different channels.

Yet another commonly used access method is presented in FIG. 9, known as Code Division Multiple Access "CDMA". In the example shown, different users can be separated in time and frequency domains using a particular version known as Frequency Hopping CDMA "FH-CDMA".

Combining FH-CDMA with TDMA creates a more cost-effective access method, called Frequency Hopping TDMA "FH-TDMA", as presented in FIG. 11. An example of such an FH-TDMA system can be found in current VTECH® 2.4 GHz and 5.8 GHz cordless telephones based on WDCT, FH-TDMA/TDD. In frame n−1 117, Traffic bearer 110 is established over downlink 113 and uplink 114 time slots at channel F1 115. Frequency hopping in this system is done on a "frame-by-frame" basis, performing a channel change for the traffic bearer in each frame. In frame n 118 the same Traffic bearer 110 is established in the same downlink 113 and uplink 114 time slots, over a different channel F2 116. In every other frame the channel changes. According to FCC regulations, for one traffic bearer, frequency hopping is performed from a sequence of 75 pseudo-randomly selected channels from a pool of 95 channels. Instead of frame-by-frame frequency hopping, in other known systems half-frame-by-half-frame frequency hopping is used, with change in channels at the half frame boundary.

However, one substantial difficulty faced by designers of electronic equipment utilizing the 2.4 GHz ISM band is interference generated by operation of a common household microwave oven. During their operation, microwave ovens generate substantial levels of RF energy throughout the 2.4 GHz frequency range. Therefore, when a microwave oven is in operation, a nearby, active 2.4 GHz cordless telephone of prior art design would commonly experience substantial interference. Such interference would degrade the sound quality of the telephone call to an objectionable, if not unusable, level. The impact of microwave oven radiation on cordless telephone operation is particularly significant when users place the cordless telephone base unit directly on top of a microwave oven. In certain circumstances, it is possible that a cordless telephone call conducted in the presence of microwave oven generated interference would be dropped altogether.

Prior art frequency domain interference avoidance techniques are of limited effectiveness in the presence of an interference source that emits interfering energy over a substantial portion of a communication band. It is estimated that a microwave oven may radiate substantial levels of interfering RF energy on a majority of the frequency channels defined in the 2.4 GHz ISM band.

Accordingly, it is an object of this invention to provide a method that can be used in conjunction with a wireless communications system to avoid electromagnetic interference radiated by a microwave oven, or similar source.

Another technical problem that this invention addresses is a problem of multi-path fading, superposition of the reflected signals at the receive side of the link. This problem impacts audio quality especially in frequency hopping systems, since for one communication connection a plurality of channels is used, all having different wavelengths. Therefore, a received signal is often faded and corrupted, resulting in a voice mute or unpleasant tone being received. This is more noticeable when amplitudes of the reflected and direct signals are similar, which is typically the case when link parties are further away, close to the end of an operational range.

Prior art frequency domain interference avoidance techniques can help reduce this problem by switching bad channels. However, audio corruption is still a problem, since there is time delay between when a channel is detected as bad until it is physically replaced by another channel. Until successful replacement of the bad channel, a user will experience a degradation in sound quality. Since the user can move together with a handset while continuing a conversation, an environment and position of reflected objects can change, creating paths with different lengths. Consequently, dynamic changing of channels may not be sufficient to provide a highest voice quality. Another disadvantage of using dynamic change of channels to avoid multi-path fading is in increased processing power and signaling throughput required for processing of channels quality and associated communication link commands.

Some prior art systems use antenna diversity in order to solve this problem. A principle of operation is based on a difference in physical paths between two antennas. A receive event will start by using a first antenna. During that time, a quality criteria can be measured such as receiver signal strength "RSSI" and/or ability of the receiver to synchronize on a preamble, alternating a one and zero pattern at the beginning of the transmission. After a specified period the receive event will be continued by using a second antenna, and the same quality measurement as used for the first antenna is performed. At some specified point in time, comparison of two quality measurements is performed, and a receiver is switched to use the antenna that exhibits better measurement results, so that the better antenna can be used to receive the rest of the data associated with the time slot.

A problem with the above method is that estimation of the quality criteria is performed over a short period of time that may not accurately represent channel quality for the duration of the whole time slot.

It is an object of this invention to provide a method that can be used in conjunction with a wireless communications system to avoid interference radiated as a result of multi-path fading.

Yet another technical problem is avoidance of interference produced by other nearby frequency hopping wireless systems. Known frequency hopping wireless systems often transmit over one channel for a short period, typically insufficient to trigger frequency domain interference avoidance. Since a first frequency hopping wireless system can corrupt different channels often used in a hopping sequence of a second system, voice quality of the second system can be degraded.

It is an object of this invention to provide a method that can be used in conjunction with a wireless communications system to avoid radiated interference from other wireless systems that utilize frequency hopping.

In addition to reliability and sound quality, power efficiency of a cordless telephone handset is an important consideration in cordless telephone design. Cordless telephone customers demand telephones with extended battery life, such that talk time and time between required charging of the telephone handset needs to be as great as possible. However, consumers also desire compact and light weight portable telephone handsets, which, in turn, limits the physical size and, in turn, the electrical capacity of the battery that may be incorporated. While compact, high energy density battery technologies are one solution, they tend to be expensive, thereby increasing the cost of a cordless telephone that uses high density batteries to extend talk time. Therefore, it is highly desirable, and therefore it is an object of this invention, to provide a cordless telephone design that is power efficient.

Finally, some advanced wireless communications systems utilize multiple communication links over a single time domain multiplexed data frame. For example, advanced cordless telephone base units may support multiple portable handsets; wireless data communications may involve multiple devices on different time slots of a common carrier; and Wireless Local Loop technology may provide wireless telephone line service to a plurality of handsets in one or more homes using a common RF carrier. Therefore, it is an object of this invention to provide an interference avoidance technique that efficiently utilizes the capacity of a communications channel.

These and other objects of this invention will become apparent to those of ordinary skill in the art in view of the invention described herein.

SUMMARY OF THE INVENTION

In an embodiment of the present invention, a method for reducing interference from a wireless communications system includes a step of setting an interference threshold for the wireless device. The interference threshold is set based on a criterion such as a quality criterion that can be measured during operation of the system. Preferably, information containing the interference threshold is stored in a memory residing in the communications system, such as an Electrically Erasable Programmable Read Only Memory (EEPROM) in a base station device. The quality criterion is measured during system operation, for example, while a handset is communicating with a base station. Preferably, a separate quality criterion measurement is performed for each of an uplink and a downlink of the wireless communications system. The quality criterion is then compared to the information containing the set interference threshold. For example, a quality criterion can be a received strength signal indicator, and a set interference threshold can be a value of the received strength signal indicator (RSSI). A breach of the interference threshold for the uplink or the downlink is determined when the measurement indicates that the measured quality criterion is sufficiently poor that operation of the system should be modified. For example, the RSSI may fall below a minimum tolerable value, indicating that the interference threshold has been exceeded. Upon determination of an interference breach in either the uplink or downlink, the system initiates an asymmetric enhanced mode operation in which redundant data transmission is established over the link exhibiting the interference breach, while standard, non-redundant transmission continues on the other link.

The invention allows a digital communications system to avoid interference that is comprised of short periodic bursts of energy, such as that emitted by a microwave oven onto many frequency channels of the 2.4 GHz ISM frequency band. Upon detecting the presence of such interference, the transmitter is assigned two separate time slots in a time domain multiple access communications link. The slots are separated in time by a period greater than the duration of one of the interference bursts to be avoided. In accordance with one aspect of the invention, each transmitted data packet can be transmitted during both assigned time slots, so that at most one of the transmitted packets can be corrupted by an interference burst. When the periodicity of the interference bursts is identified, a transmitter can be instructed to transmit each data packet only once, on an assigned time slot that will not be affected by the interference burst. Finally, in accordance with another aspect of the invention, the communication system may synchronize to periodic interference bursts to increase the capacity of the communication system during the interference condition. The interference bursts are centered on one or more fixed time slots in the data frame, such that communications can occur in the remaining time slots without doubling the bandwidth assigned to each communication link by assigning redundant time slots.

DESCRIPTION OF THE DRAWINGS

FIG. 7 is a time-domain diagram showing the known method of Frequency Division Multiple Access (FDMA).

FIG. 8 is a time-domain diagram showing the known method of Time Division Multiple Access (TDMA).

DETAILED DESCRIPTION OF THE INVENTION

Figure 1:
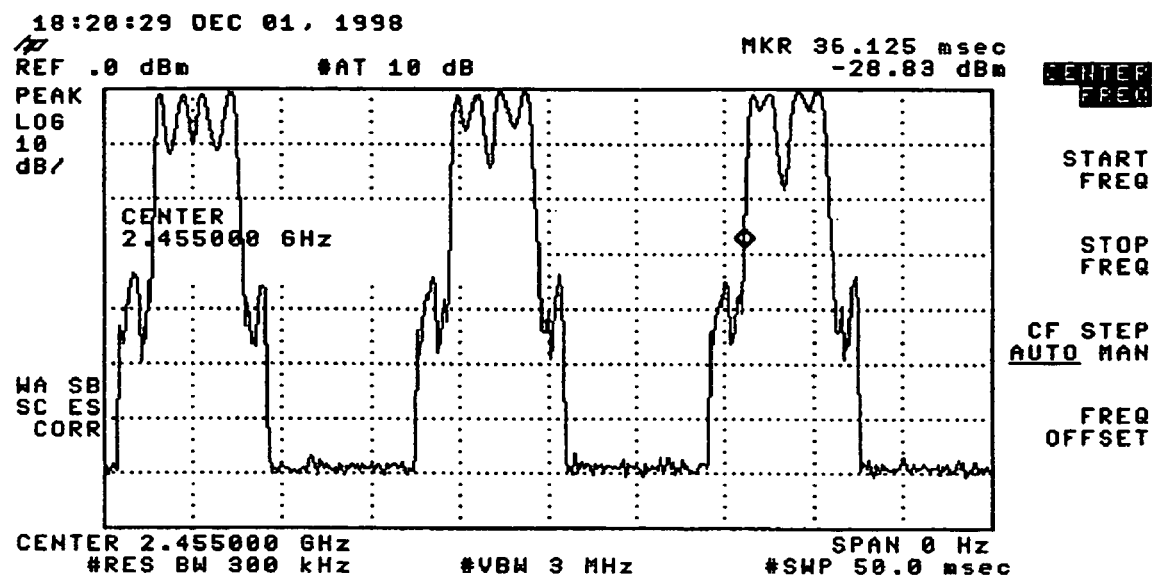
FIG. 1 is a time-domain graph of electromagnetic energy radiated from a microwave oven according to a first characteristic of the microwave radiation.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. For instance, although embodiments disclosed herein are directed towards the operation of devices associated with a phone system, embodiments of the present invention associated with other signaling devices in a home, such as doorbells, and intercoms are anticipated. Also, it is to be understood that the phraseology and terminology used herein is for the purpose of description and should not be regarded as limiting.

While this invention is susceptible to embodiment in many different forms, there are shown in the drawings and will be described in detail herein several specific embodiments. The present disclosure is, to be considered as an exemplification of the principle of the invention intended merely to explain and illustrate the invention, and is not intended to limit the invention in any way to embodiments illustrated. In particular, while the invention is described herein in the context of a 2.4 GHz WDCT cordless telephone embodiment, it is understood that the invention disclosed could be applied to any time duplexed communications link operating in the presence of intermittent broad-band interference.

A microwave oven emits high levels of electromagnetic energy centered around the 2.4 GHz frequency range while in use. The electromagnetic radiation emitted by a microwave oven is periodic in time, having a cycle frequency equal to the frequency of the AC power supply to the microwave oven—typically 60 Hz in North America. Two primary time domain characteristics of this electromagnetic radiation have been identified as interfering with wireless communications conducted in the 2.4 GHz ISM band. What is termed "segment A" radiation is depicted by the time domain power meter graph illustrated in FIG. 1, and occupies a substantial portion in the time domain of the channels on which it appears. Segment A radiation is comprised of high level emission on numerous frequencies around 2.4 GHz for approximately one half of the duration of an AC power cycle, or about 8 ms, during which time the microwave oven magnetron is powered. This high level emission is followed by an absence of emission for the remaining half of each cycle, during which time the microwave magnetron is not powered.

It has been observed that segment A radiation appears on a limited number of frequency channels utilized by 2.4 GHz WDCT cordless telephones. In particular, segment A radiation has been observed to interfere with approximately 10 of the 95 cordless telephone channels defined in the 2.4 GHz ISM band. Therefore as a practical matter, segment A radiation can be effectively avoided by implementing known frequency domain interference avoidance techniques, such as a frequency hopping dynamic channel allocation algorithm, which avoid any communication over the susceptible channels in the presence of segment A radiation. Thus, for a system operating in the 2.4 GHz ISM band, such a prior art technique would result in the ability to transmit information over one or more of the 85 remaining channels identified as not being subject to segment A radiation.

Figure 2:
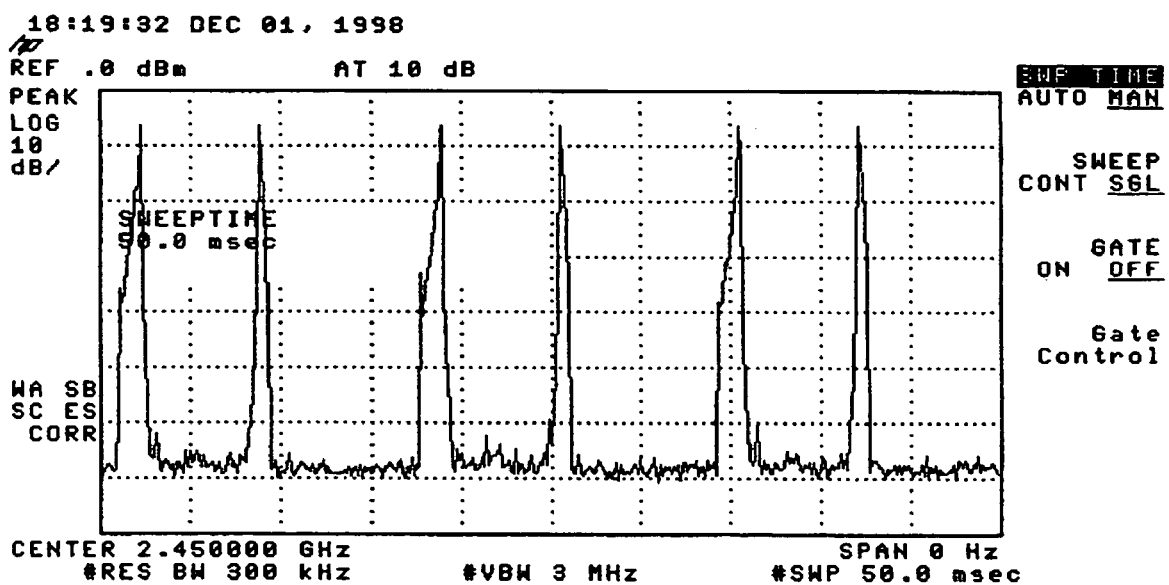
FIG. 2 is a time-domain graph of electromagnetic energy radiated from a microwave oven according to a second characteristic of the microwave radiation.

Microwave ovens have also been observed to generate electromagnetic radiation demonstrating a second characteristic, referred to herein as segment B radiation, which is depicted by the time domain graph illustrated in FIG. 2. One period of segment B radiation is comprised of two high-level bursts of energy approximately 1 ms in duration, occurring at the beginning and at the end of the half of the AC power cycle during which the microwave magnetron is powered.

However, unlike segment A radiation, segment B radiation has been found to interfere with a majority of the 2.4 GHz ISM channels. Prior art frequency domain interference avoidance techniques such as dynamic channel allocation described above, are therefore not effective solutions to isolate the frequency channels susceptible to segment B radiation because such schemes lave too few clean channels available over which communications can be conducted. As a result, systems implementing prior art dynamic channel allocation end up suffering significant levels of periodic interference, and associated high error rate and poor audio quality.

Figure 3:
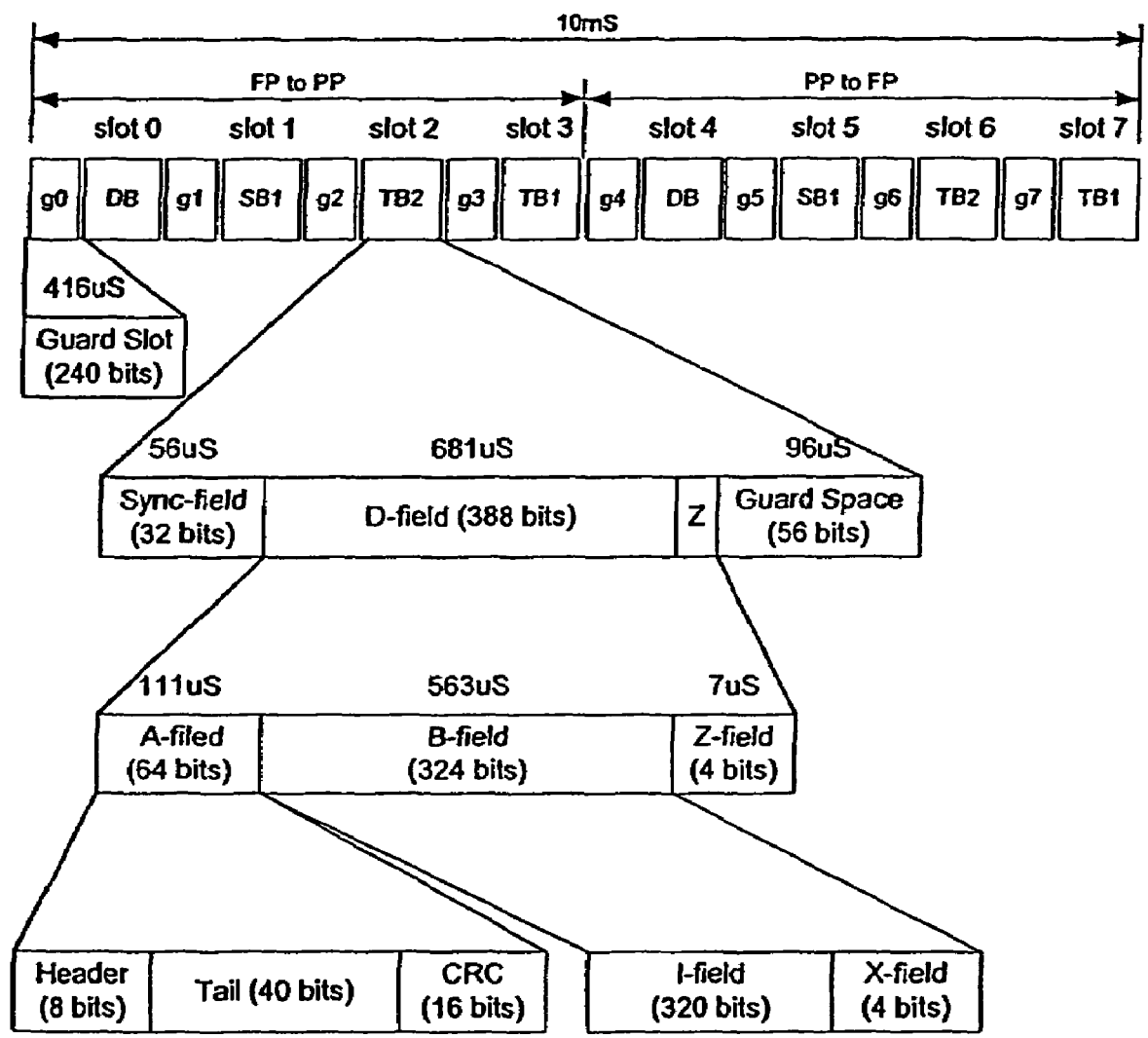
FIG. 3 depicts the format of a WDCT frame.
Figure 5:
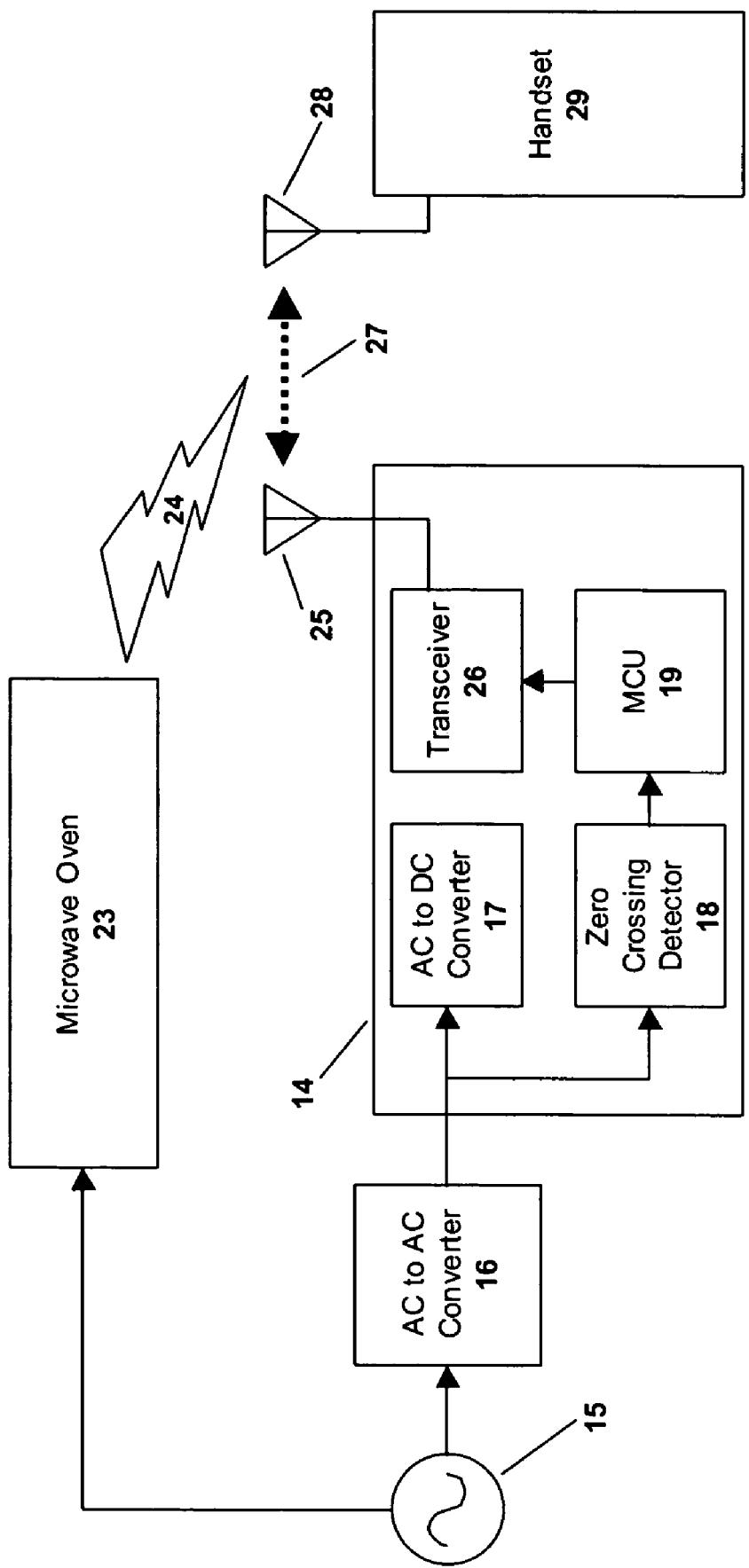
FIG. 5 is a schematic block diagram of a communications system that implements the methods of this invention.
Figure 9:
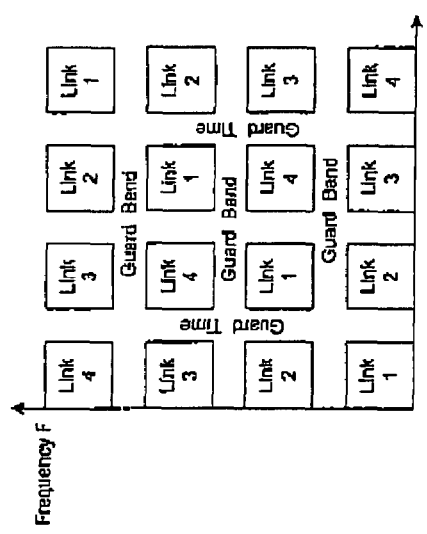
FIG. 9 is a time-domain diagram showing the known method of Code Division Multiple Access (CDMA).
Figure 10:
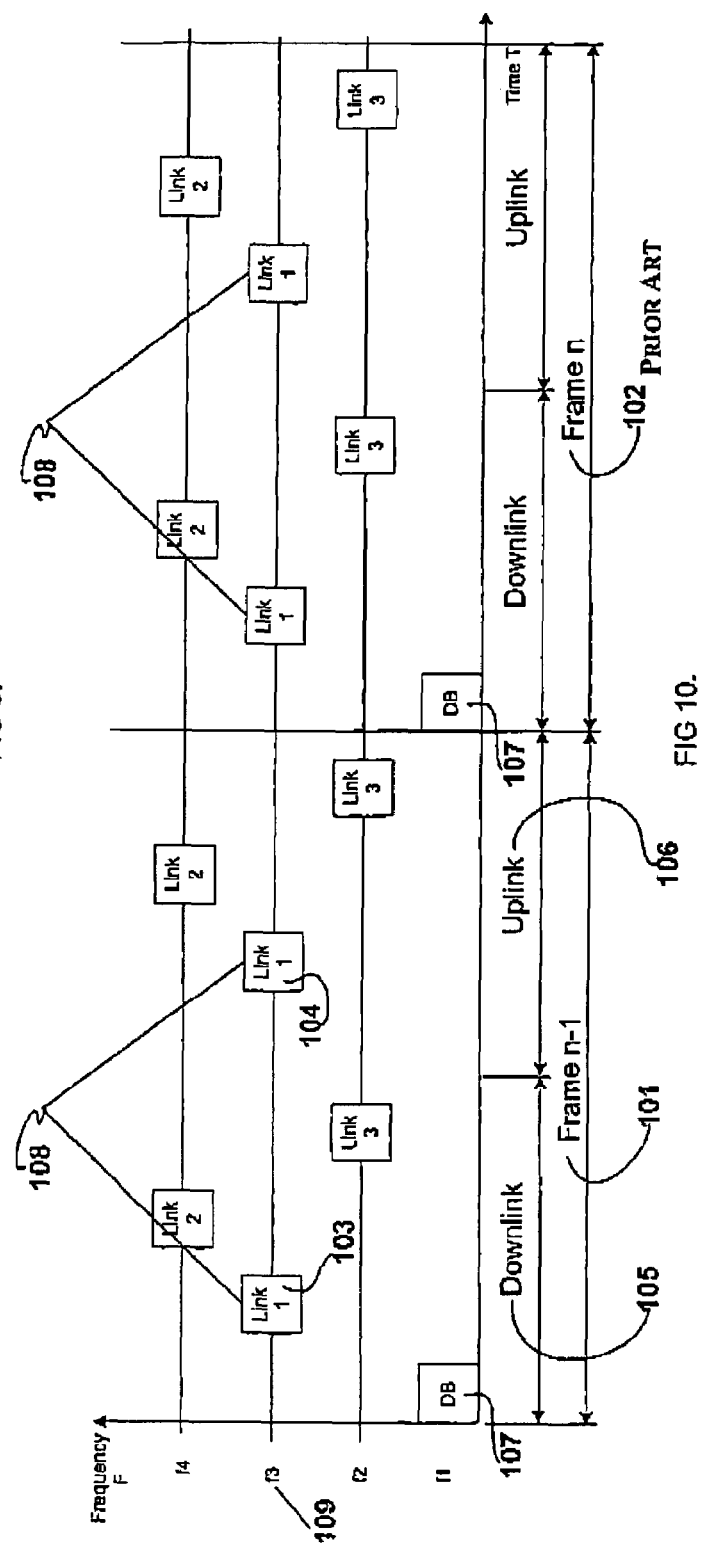
FIG. 10 is a time-domain diagram showing two 10 ms time frames of the known method of Multiple Carriers Time Division Multiple Access, Time Division Duplex "MC/TDMA/TDD", used in DECT
Figure 11:
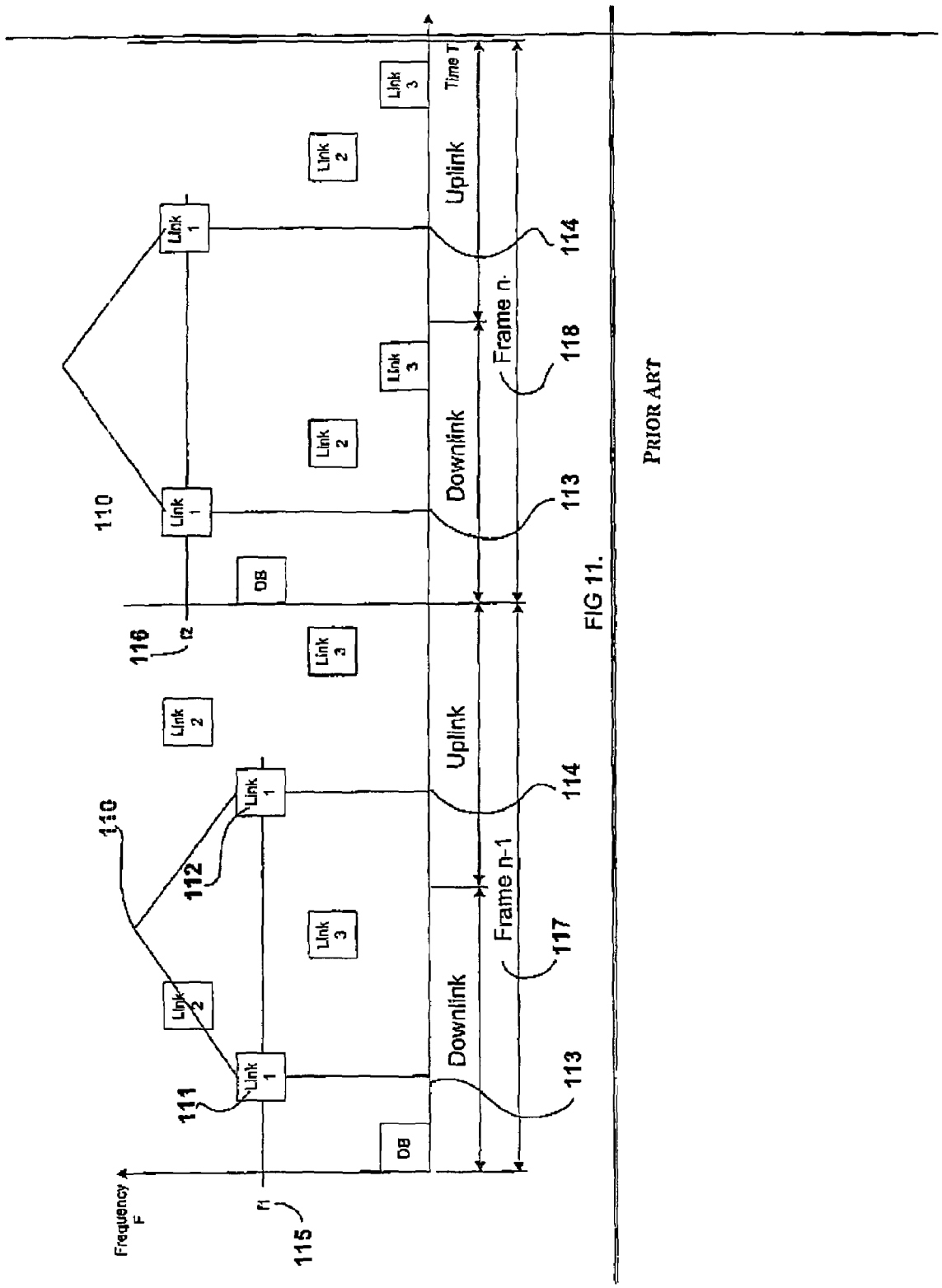
FIG. 11 is a time-domain diagram showing two 10 ms TDMA frames of the known method of Frequency Hopping Time Division Multiple Access, Time Division Duplex "FH-TDMA/TDD", used in VTECH® WDCT based cordless telephones.

Therefore, this invention provides a time domain method for implementing a reliable wireless communication system using frequency channels susceptible to periodic, bursty electromagnetic interference such as the segment B interference described above. The embodiment depicted in the block diagram of FIG. 5 is a cordless telephone system that employs a TDMA frequency hopping wireless communications link with a WDCT-based frame structure. The composition and timing of a typical WDCT data frame is disclosed in FIG. 3.

Figure 4:
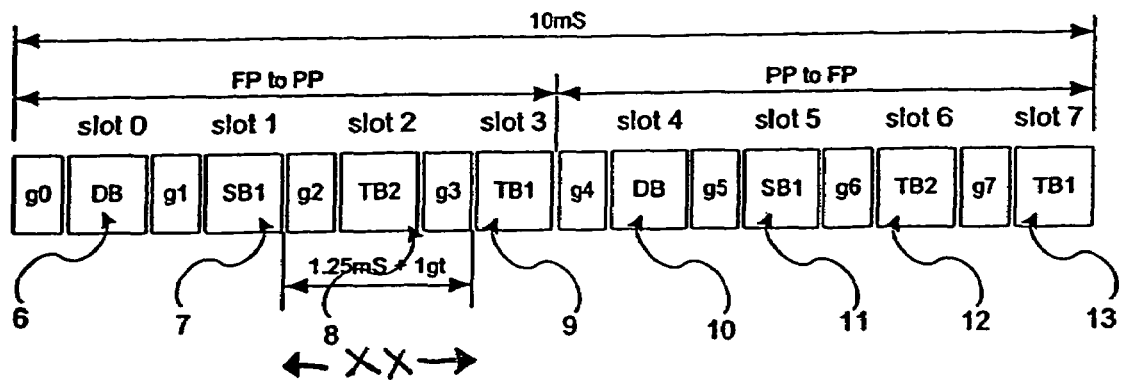
FIG. 4 shows the WDCT frame slot utilization during enhanced mode operation.

FIG. 4 depicts the WDCT frame structure with which the cordless telephone system of FIG. 5 conducts calls. The frame supports four physical links. During normal operation in the absence of segment B interference, transmissions from base unit 14 to portable unit 29 (the "downlink") are assigned to one of time slots 6, 7, 8 or 9. Each time slot is preceded by a 416 μs guard band, during which time communication does not occur. Communications from portable handset 29 to base unit 14 ("uplink") are assigned to time slots 10, 11, 12 or 13 accordingly. Therefore, during normal operation, base unit 14 can support up to four full-duplex communication links to separate handsets.

However, segment B radiation can inhibit reliable communications for the duration of each interference burst—such as when either handset 29 or base unit 14 is located near an active microwave oven. Oftentimes, consumers place base unit 14 directly on top of a microwave oven, thereby further exacerbating the impact of such segment B radiation.

Figure 12:
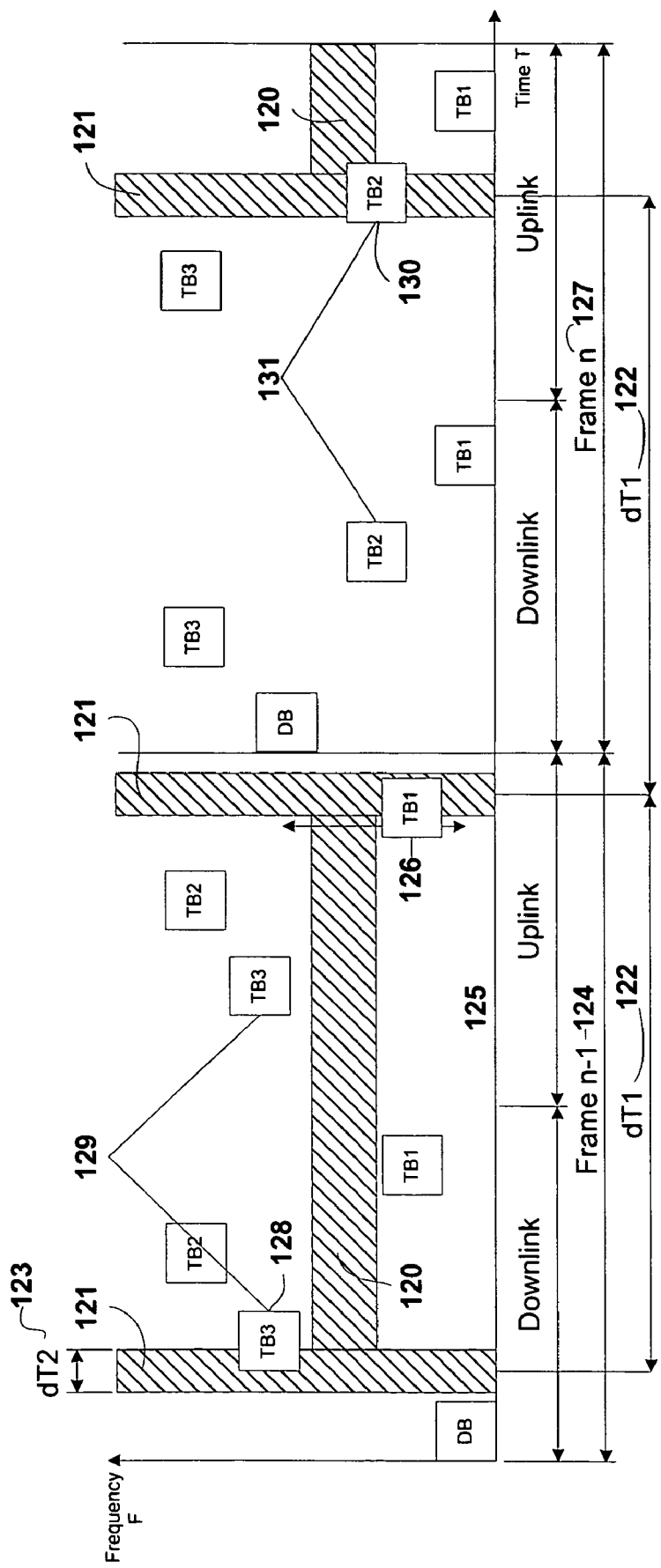
FIG. 12 is a time-domain diagram showing two 10 ms TDMA frames of a VTECH® WDCT based cordless telephone system together with interference that is radiated from the microwave oven.

FIG. 12 depicts a TDMA system that employs frame-by-frame frequency hopping in the presence of interference that is generated from microwave oven. A duration of each TDMA frame is 10 ms. Segment A radiation 120 from a microwave oven is typically allocated over a smaller pool of about 10 channels for the duration of dT1 122, about 7 ms to 9 ms. Segment B radiation 121 is allocated over almost the whole frequency spectrum, depending on how far away a base and/or handset are from a microwave oven. If a handset or base are within close proximity to the microwave oven, interference levels can occur during the duration of dT2 123 of about 1 ms. Segment A interference 120 and segment B interference 121 profiles are periodic with an AC power cycle used to power the microwave oven.

In frame n−1 124 interference from a microwave oven can corrupt a voice link that uses Traffic bearer 1 TB1 125. In particular, only uplink 126 portion of TB1 125 will be corrupted. In the same frame n−1 124 downlink 128 of the Traffic bearer 3 129 is corrupted. Both traffic bearers are thus corrupted as a result of segment B 123 interference profile. In frame n 127 uplink 130 of the Traffic bearer 2 131 is corrupted by segment A 120 and segment B 121 interference profiles.

Dynamic channel reallocation can help in principle by moving TB2 131 uplink 130 to some other channel, but Segment B 121 interference is still present on a majority of other channels in uplink 130. Since a time base of interference from a microwave oven is aligned with the AC power cycle, interference profiles associated with segment A 120 and segment B 121 will drift in time domain with respect to TDMA frame of the system. When in close proximity, segment B 121 interference can corrupt a majority of channels during each dT2

123 period. Because of this, at 7 ms to 9 ms intervals, at least one or two voice calls may be interrupted. Two voice calls can be interrupted when Segment B 121 interference is centered in a time domain in between two adjacent bearers that belong to two voice calls, and interference duration dT2 123 is sufficiently wide to corrupt data in both slots.

In accordance with an embodiment of the present invention, active physical links between a base unit and portable handset are assigned redundant time slots in a WDCT frame in addition to the primary bearer upon which they normally communicate. This specific mode of operation is termed "Enhanced" mode. In enhanced mode operation, each transmitted data packet is conveyed independently over both the primary and redundant links.

Preferably, in order to ensure that a segment B interference burst does not influence both the primary and redundant timeslots for a given physical link, the timeslots are separated in time by an interval different than that between any two segment B bursts, and greater than the duration of a single segment B burst.

Figure 13:
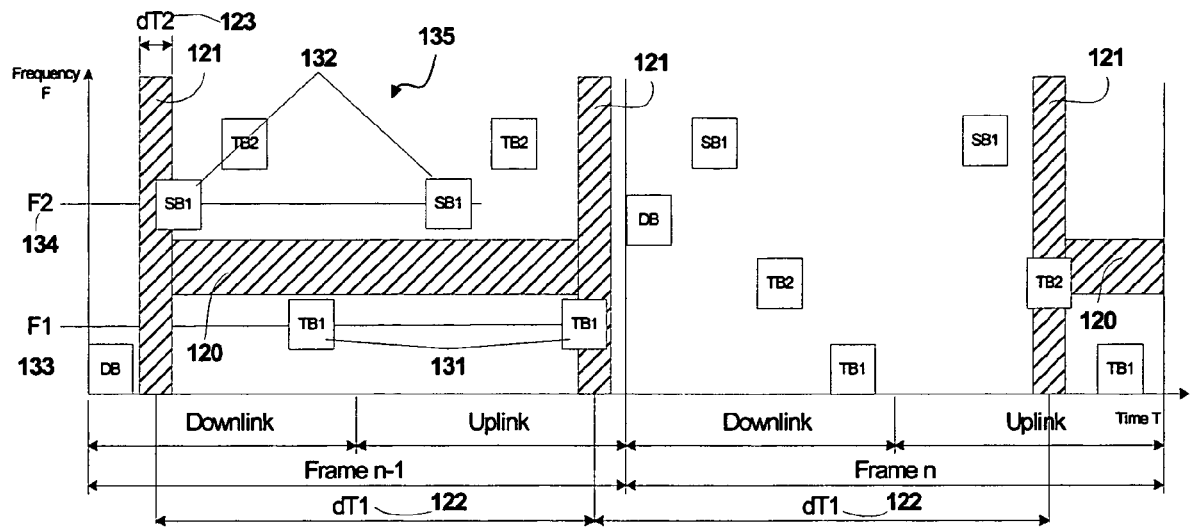
FIG. 13 is a time-domain diagram showing two 10 ms TDMA frames having one enhanced connection, according to an embodiment of the present invention.

FIG. 13 illustrates operation of enhanced mode according to an exemplary embodiment of the present invention. One voice connection is established by using two bearers, a "primary" TB1 bearer 131 and the redundant link, "secondary" SB1 bearer 132. Since the hopping sequences between different bearers are independent, primary and secondary bearers 131,132 can be established over different channels F1 133 and F2 134, respectively, within one TDMA frame 135.

By establishing a redundant link, secondary bearer 132, voice quality in the presence of segment A 120 and segment B 121 interference is significantly improved. Since SB1 1132 and TB1 131 employ independent hop sequences, voice quality can be improved in the case of multi-path fading or interference generated from other frequency hopping systems.

In the case where two different FH-TDMA/TDD systems operate in the same band and in close proximity, interference generated is generally much harder to avoid. A first problem is that FH-TDMA/TDD systems attempt to use a whole-allocated band, thereby limiting the number of channels that are free of interference and available for use as replacement channels. A second problem is that an interfering FH-TDMA/TDD system may transmit only for a short period of time on a pseudo-randomly generated channel. A presence of interference from such FH-TDMA/TDD systems for a given channel is harder to detect. Required link quality thresholds in RSSI levels, number of lost synchronization and/or packet/bit errors are less likely to be reached, thereby reducing the probability that a channel experiencing the brief interference is detected as a bad. This result is especially likely due to the fact that TDMA frame timing and frequency allocation for two separate units are typically different. For any given channel, interference is present only momentarily, which often may not be sufficient to reach thresholds for dynamical channel replacement. Since several channels may typically be bad within a given the hop sequence, a received voice stream will receive corrupted information and a voice signal will not be correctly reproduced.

In accordance with one aspect of the invention, the cordless telephone set of FIG. 5 preferably enters an enhanced operation mode upon detection of interference from segment B radiation. Numerous methods can be utilized to determine when the enhanced operation mode should be entered. A basic system can simply count the number of errors on each time slot, and when the number of errors on a given time slot exceeds a predetermined threshold, enhanced mode is initiated. In this case base 14 of such a cordless telephone set does not need to have zero crossing detector 18 and AC to DC converter 17 may be external to base 14, typically integrated in AC to AC converter 16.

However, such a basic system will utilize enhanced mode in the presence of any type of interference originating from a microwave oven, other frequency hopping system or as a result of multi-path fading, regardless of whether it is periodic and bursty or not.

An alternative method for detecting segment B interference involves observing and/or recording the timing information when each error occurs, e.g. the packet and timeslot number that was received with an error. Such a system could enter enhanced mode upon observing a series of errors somewhat evenly spaced in time. However, because the time resolution for observing errors is necessarily limited to the duration of a time slot with associated guard band, multiple errors must typically be observed before the interference burst period can be calculated with reasonable accuracy.

A further and preferred example method of detecting the presence of segment B radiation involves observing the time at which packets are incorrectly received with respect to the timing of the AC power line supplying power to the cordless telephone base. Base unit 14 is powered by wall AC power source 15 through AC to AC converter 16. The power input is then routed to AC to DC converter 17 for distribution to the base unit circuitry. The AC power input is also routed to zero crossing detector 18. Zero crossing detector 18 generates an output signal which is applied to an interrupt of microcontroller unit ("MCU") 19, whereby MCU 19 can determine the frequency and polarity of AC power source 15.

Microwave oven 23 is also connected to and powered by AC power source 15. The timing and operation of the magnetron inherent in microwave 23 is dependent upon the frequency and phase of AC power source 15. In turn, the timing of segment B emission 24 is also dependent upon the frequency and phase of AC power source 15. By providing base unit 14 with this information, the timing of received errors with respect to the phase of AC power source 15 can be determined. If errors occur repeatedly at a consistent timing position with respect to the phase of AC power source 15, MCU 19 determines that segment B radiation is present, and signals transceiver 26 to initiate the enhanced mode of operation. After segment B interference is detected once, the base unit may determine that a microwave oven, or other source of periodic interference, is present in the vicinity of the base unit. Accordingly, the base unit may subsequently employ a lower threshold for determining that a segment B interferer is active, such that the enhanced mode of operation is initiated after detection of a lower number of periodic errors.

For example, base unit 14 and handset 29 normally communicate on downlink time slot 9 and uplink time slot 13 of communication link 27. Base unit 14 detects segment B radiation 24, and places communication link 27 into enhanced mode. Referring to FIG. 4, in enhanced mode, each downlink data frame is transmitted twice, on both time slots 7 and 9. Similarly, each uplink data frame can be transmitted twice, on both time slots 11 and 13. Moreover, the period XX between downlink slots 7 and 9 or uplink slots 11 and 13 is 1.67 ms. The time period between consecutive segment B radiation bursts is approximately 7 ms to 9 ms, and the duration of a segment B radiation burst is typically approximately 1 ms. Therefore, a single segment B radiation burst will not interfere with both primary and redundant uplink or downlink time slots, and two consecutive segment B radiation bursts will not interfere with both primary and redundant uplink or downlink time slots. Therefore, using the timing scheme of the present invention, at least one of the primary or redundant time slots is likely to be communicated across link 27 without interference from segment B radiation 24.

In order to maintain proper operation of the receiver while in enhanced mode, it is desirable to maintain a constant rate stream of data into the receiver Coder/Decoder ("CODEC"). The CODEC is the transceiver component that is responsible for converting received digital data into audible information. A CODEC is typically designed to accept data at a constant, predetermined rate. Accordingly, a buffer is serially incorporated into the CODEC input data path, such that for any given data packet, copies of the packet are received on both the primary and redundant links before one copy is selectively conveyed to the CODEC. The information from a data packet received without error, whether over the primary or redundant time slot, is buffered into the CODEC for playback at a constant rate with timing referenced to the WDCT frame.

Two downlinks that belong to a single voice link in the enhanced mode can be established on two different channels within duration of the one TDMA frame. Similar to the above, two uplinks that belong to one voice link can be established by having different channels within one TDMA frame. Since redundant information is sent by using two different channels, there is a higher probability that information will be correctly received on the other side of the link. Using different carrier wavelengths ensures less probability of having both sets of received data corrupted at the same time as a result of multi-path fading or as a result of interference from other frequency hopping based systems. Voice quality in the enhanced mode is thus much better in comparison with the standard mode of operation.

In an embodiment of the present invention, an "auto" configuration feature is provided, such that when active, a system automatically switches an active voice connection into enhanced mode based on specified link quality criteria. In another embodiment of the invention, a "manual" configuration is provided that enables a user to manually enable or disable setting the system into enhanced mode, and allows the user to turn on or off the auto configuration feature. In other embodiments of the present invention, quality criteria for switching into enhanced mode are preprogrammed during manufacturing, modified in real-time based on algorithms for analysis of interference profiles, or manually updated by a user.

While the enhanced mode is effective in ensuring the integrity of communication link 27 in the presence of segment B radiation 24, the enhanced mode operation in the embodiment described inherently requires the transmission of each data packet twice. Typically, a substantial portion of the power required to operate a portable handset is used to transmit RF signals. Therefore, enhanced mode operation may substantially increase the power required to operate handset 29, and in turn reduce its talk time and battery life.

Therefore, in accordance with another aspect of this invention, the enhanced mode can be implemented in a manner eliminating the requirement that handset 29 transmit each data packet twice if handset 29 determines the periodic timing of the interference source. By measuring the timing of the segment B interference bursts, as described above in reference to the detection of segment B interference, a transceiver can pre-determine with which, if any, of the uplink time slots the segment B burst will interfere. The handset then transmits only on the uplink time slot that will not suffer from segment B interference.

In the previously-described embodiment in which base unit 14 directly measures the timing of AC power source 15, base unit 14 must transmit information to handset 29 indicative of the determined segment B interference timing. Thus, during enhanced mode operation, base unit 14 specifies to handset 29 the time slot upon which the handset shall transmit. In particular, a field in the downlink packet header is utilized to specify which of the active uplink time slots should be utilized by handset 29 to transmit its data packet. Furthermore, to avoid potential synchronization problems when two portable handsets are transmitting at the same time on the same RF channel, handset 29 does not transmit at all unless and until it receives a time slot assignment in the packet header from base unit 14. By carefully limiting handset transmissions to known "clear" time slots, handset power is conserved and system reliability is improved.

Although the handset transmitter operates on only one of two potential uplink time slots, in the embodiment illustrated the handset receiver continues to monitor both downlink time slots. Such operation may be desirable inasmuch as receiver circuits typically draw far less power than transmitters, and robustness of the communication link is improved since the base unit can attempt to contact the portable unit via either or both time slots. Furthermore, by actively receiving communications on both the primary and redundant time slots, handset 29 and/or the base unit 14 can determine when communications over both time slots are consistently being received without error, indicating that the segment B interference source is no longer present. At this time, handset 29 and base unit 14 can reenter the normal, non-redundant communications mode.

While the enhanced mode as has been described is effective in avoiding the effects of segment B radiation for a given communications link, the use of redundant time slots for each link reduces the number of connections available within the WDCT frame by half. However, in some systems this problem can be mitigated by synchronizing the transmission frame to the timing of the segment B radiation. The WDCT frame is modified by altering its duration. The frame duration can be controlled to align the frame timing such that the segment B bursts are centered within a single fixed time slot in each frame. Communications over other uncorrupted timeslots can then be conducted in standard mode, avoiding the need to assign a redundant time slot to every active communication link.

In accordance with this aspect of the invention, a detection circuit that includes AC to AC converter 16 and zero crossing detector 18 for detecting the timing of AC power source 15 is employed to provide the timing to MCU 19. MCU 19 then identifies the phase shift inherent between the AC power as detected by MCU 19, and the AC power as applied to the magnetron of microwave oven 23 by monitoring the timing of detected segment B radiation bursts. MCU 19 then controls the communication link data timing such that the center of a predetermined time slot is aligned with a segment B radiation burst, as depicted in FIG. 6.

Figure 6:
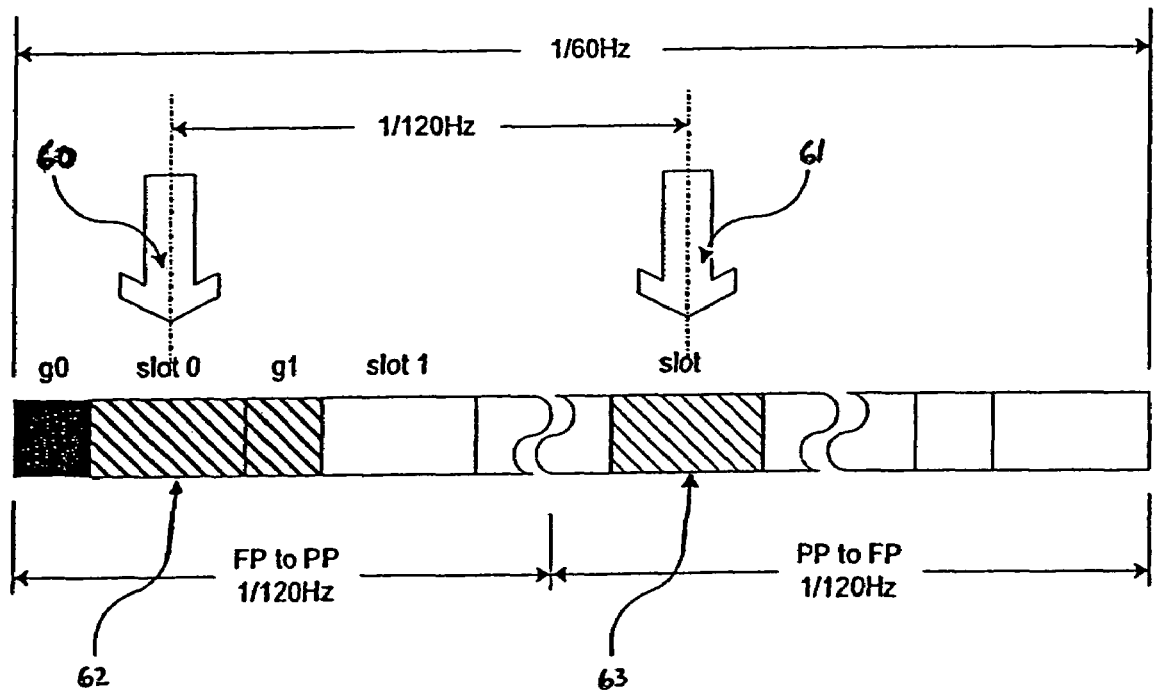
FIG. 6 depicts the system frame format upon synchronization with a source of periodic burst interference.

FIG. 6 depicts a time domain graph of a data frame in a system that has been synchronized with the segment B radiation pattern, which is inherently synchronized with the 60 Hz AC power source. Segment B bursts 60 and 61 are spaced approximately every 8.3 ms, or half the period of the AC power cycle. The frame duration is 1/60 Hz, or about 16.67 ms. Using a WDCT-type frame structure with modified timing that includes four downlink slots and four uplink slots, each data time slot has a duration of approximately 1.39 ms, and is surrounded on each side by 693 µs guard bands. By synchronizing the frame timing so that segment B burst 60 is centered in the time period of downlink slot 62, and by centering segment B burst 61 within uplink slot 63, the segment B radiation pattern only eliminates one uplink-downlink timeslot pair. Therefore, communications can be conducted on all other time slots in standard mode, by using any of approximately 85 channels without segment A interference without the doubled bandwidth otherwise inherent in enhanced mode operation.

It is recognized that the technique described herein could be used in conjunction with alternative frame timing formats to minimize the need for enhanced mode operation. For example, the frame length could be established as any integer multiple or divisor of the segment B radiation period. To the extent that alignment of segment B bursts within the transmission frames remains constant over time, standard mode communications can be conducted on remaining clear time slots, and a net capacity improvement over full enhanced mode operation can be seen.

Asymmetric Enhanced Mode Operation

In yet another embodiment of the present invention, a system for avoiding interference in digital communications devices employs an asymmetric enhanced mode operation. An asymmetric enhanced mode ("AEM") refers to an operation mode in a duplex (having uplink and downlink portions of a communication slot) wireless communications system in which redundant links (meaning multiple links established to transmit the same data) characteristic of the enhanced mode are established only for a link direction determined to be below a quality threshold. Thus, in AEM mode, a wireless system can employ redundant data packet transmission by using redundant links in a downlink, while only one-time transmission of a data packet takes place in an uplink. This feature is especially useful in modern wireless systems where an uplink and downlink can be established over different carrier bands. Referring again to FIG. 5, two separate frequency bands can be employed for communications between a handset 29 and base 14. For example, for a downlink direction, from base 14 to handset 29, modern wireless systems can use a 5.8 GHz ISM band, while a 2.4 GHz ISM band is used for an uplink direction from handset 29 to base 14. Typical systems utilized in this fashion will experience asymmetry in performance between downlink and uplink. For example, a shorter wavelength for the 5.8 GHz downlink is more prone to errors due to multi-path fade interference, while 2.4 GHz uplink will be susceptible to interference originating from a microwave oven or other interferers operating near the latter frequency.

In environments not containing microwave ovens, multipath fade in the 5.8 GHz ISM band may be a dominant interference source. Thus, devices employing a 5.8 GHz link may often be triggered to initiate an enhanced mode operation. In the embodiments discussed previously, the enhanced mode operation can be termed a "symmetric enhanced mode" ("SEM", also referred to as "full SEM" or "SEM mode") whereby redundant data packages are transmitted in both an uplink and downlink direction. For devices capable of operation in SEM mode, excessive interference in an uplink, downlink or both can all cause an SEM operation mode to be triggered.

However, except in the case where both uplink and downlink quality are degraded, triggering of a full SEM mode can cause unwanted problems. For example, once engaged, an enhanced connection in an uplink, by virtue of redundancy of links used to transmit and receive data, can create additional interference to other nearby wireless devices operating in the same 2.4 GHz ISM band. Thus, for a device employing a 5.8 GHz downlink and 2.4 GHz uplink, triggering of a full SEM mode by interference in the 5.8 GHz ISM band will cause redundant transmission at an uplink device frequency of 2.4 GHz, which increases the interference to nearby devices operating in the same frequency band. Thus, performance quality and throughput of wireless devices like 802.11b networks operating in 2.4 GHz ISM band can be negatively impacted by a nearby device operating in SEM mode. Yet another problem of having uplink enhanced bearers unnecessarily engaged is the resulting increased power consumption due to additional transmit and receive slots employed. This reduces the talk time of a battery operated handset, such as handset 29.

The above deficiencies can be overcome by independent, asymmetrical, control of the enhanced connection. In an exemplary embodiment of the present invention, a quality in downlink and uplink directions is independently evaluated. A wireless system independently counts the number of errors on each time slot, for each link direction. When a value for the of number errors on a given time slot exceeds a predetermined threshold for a first link direction, enhanced mode operation can be initiated individually for the first link direction, while standard mode operation is maintained for the opposite link direction, provided a quality measurement for the latter indicates that errors are below the predetermined threshold.

In an exemplary embodiment of the present invention, predetermined thresholds are separately defined for different link directions. In some embodiments, original values of predetermined thresholds are stored in a system memory such as ROM or non-volatile memory like EEPROM or FLASH. Using predetermined thresholds, storage in non-volatile memory provides for convenient system tuning after release of software and independent regulation of threshold values for uplink and downlink link quality evaluation. This may be useful as well if a same software version is required for systems operating in different combinations of downlink/uplink bands, since the systems performance and expected interference profile are frequency band-dependent.

Figure 14A:
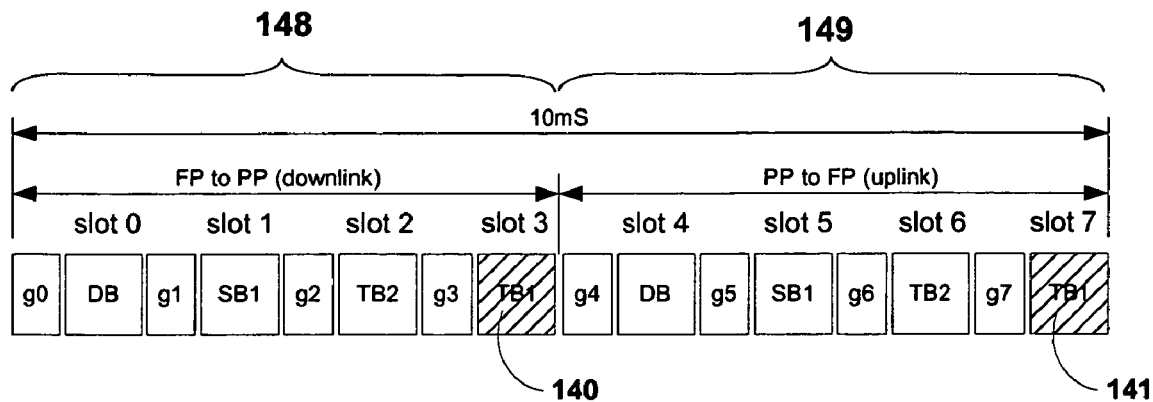
FIG. 14a shows a WDCT frame slot utilization during asymmetric enhanced mode operation for a digital communications system s operating in a standard mode.
Figure 14B:
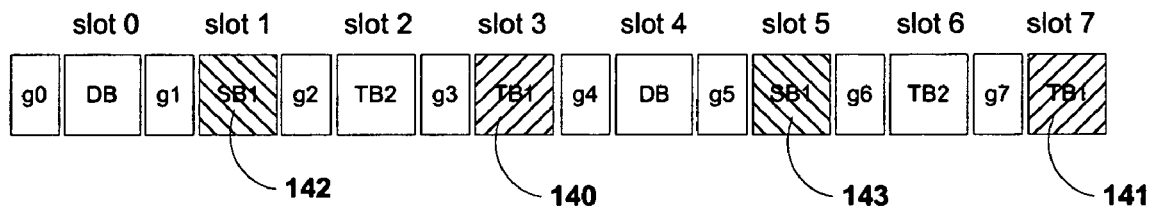
FIG. 14b shows the WDCT frame slot utilization during asymmetric enhanced mode operation for a digital communications systems operating in a full enhanced mode, according to an exemplary embodiment of the present invention.

FIG. 14*a* depicts a standard mode of operation described above, with one duplex bearer having a downlink connection over time slot 140 and an uplink connection over time slot 141. In FIG. 14*b*, a full SEM mode described above is depicted, showing two 'full' duplex bearers. A downlink is established over time slots 142 and 140 while for an uplink, slots 143 and 141 are used.

Figure 14C:
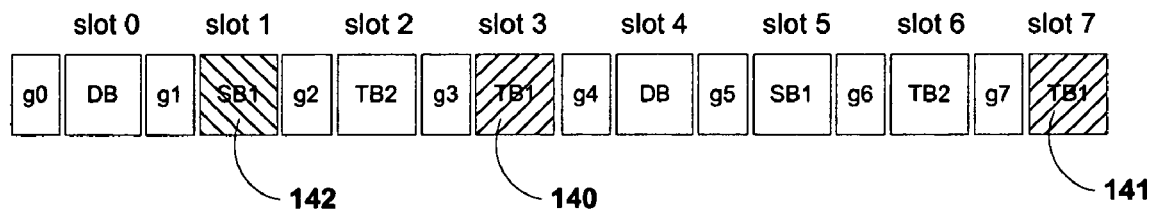
FIG. 14c shows the WDCT frame slot utilization during asymmetric enhanced mode operation for a system switched into enhanced mode only in a downlink direction, according to an exemplary embodiment of the present invention.

In an embodiment of the present invention depicted in FIG. 14*c*, an AEM mode is established in which a redundant data transmission occurs in a downlink direction only. In the scenario depicted, an interference is present in the downlink direction that is of a sufficient intensity to trigger switching into enhanced operation, while the uplink is detected to retain a good uplink quality. Downlink segment 148 of the link is therefore said to be asymmetrically enhanced. Thus, referring once more also to FIG. 5, handset 29 and base 14 are connected over one full duplex bearer having time slots 140 and 141, located in downlink segment 148 and uplink segment 149, respectively, and over one simplex bearer located in the downlink direction corresponding to time slot 142. Redundant data transmission thus occurs in slots 142 and 140 of downlink segment 148.

Figure 14D:
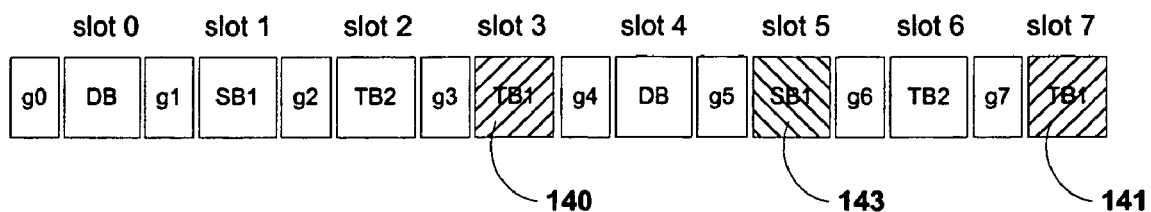
FIG. 14d shows the WDCT frame slot utilization during asymmetric enhanced mode operation for a system switched into enhanced mode only in an uplink direction, according to an exemplary embodiment of the present invention.

In another embodiment of the present invention depicted in FIG. 14*d*, an AEM mode is established in which redundant data transmission in the uplink direction only is established. In the scenario depicted, an interference is present in the uplink direction that is of a sufficient intensity to trigger switching into enhanced operation, while the downlink is detected to retain a good downlink quality. Uplink segment 149 of the link is therefore said to be asymmetrically enhanced. Thus, one full duplex bearer is present over time slots 140 and 141, in downlink segment 148 and uplink segment 149, respectively, and over one simplex bearer in uplink direction only corresponding to time slot 143. Redundant data transmission thus occurs in slots 143 and 141 of uplink segment 149.

Figure 15:
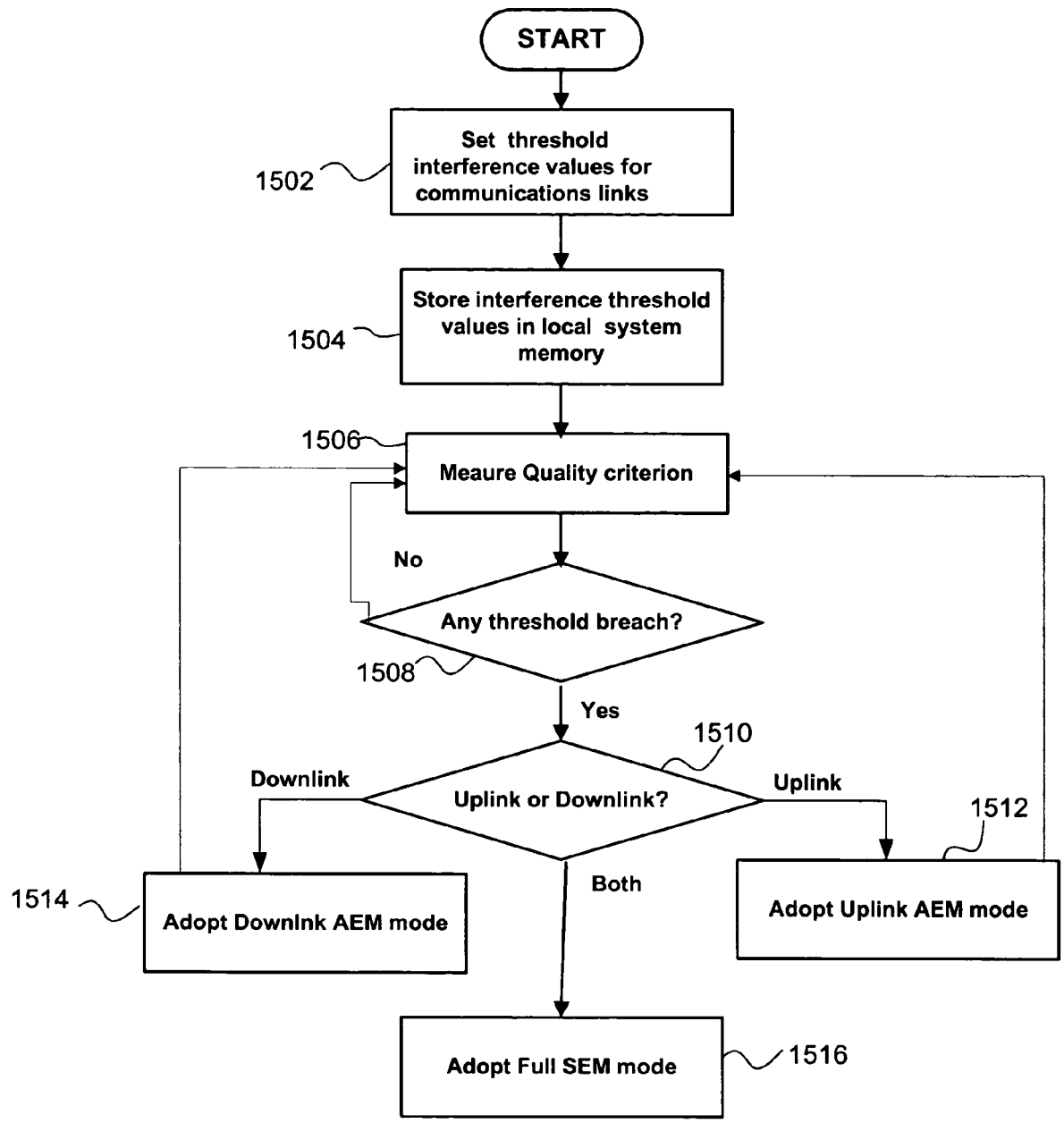
FIG. 15 illustrates exemplary steps involved in a method for reducing interference from a wireless communications system, according to an exemplary embodiment of the present invention.

FIG. 15 depicts a method for reducing interference associated with a wireless communications device, according to another embodiment of the present invention. In step 1502, threshold interference values are set for a communications system. In one embodiment, individual threshold values are established for an uplink and a downlink. For example, a user may determine that a larger interference level is tolerable in a downlink, so that a higher threshold is set. Preferably, the threshold is based on a quality criterion that can be measured conveniently during system operation such as a received strength signal indicator or bit error rate.

In step 1504, the threshold value(s) are stored in a memory, for example, in an EEPROM in a base station of a wireless system.

In step 1506 a quality criterion is measured during operation of the system. Preferably, the quality criterion is measured for each of an uplink and downlink of the wireless system.

In step 1508, the quality criterion measured is compared to the stored threshold value to see if the measurements indicate that an interference threshold has been breached. If no breach is determined, then the process returns to step 1506 for further quality measurements. If a threshold breach is detected, the process moves to step 1510.

In step 1510, if only an uplink threshold value is determined to be breached, the system adopts an AEM mode for the uplink, where redundant data transmission takes place only in the uplink segment, as in FIG. 14*d*. If, conversely, only a downlink threshold value is determined to be breached, the system adopts an AEM mode for the downlink, where redundant data transmission takes place only in the downlink segment as in FIG. 14*c*. If both uplink and downlink thresholds are breached, the process moves to step 1516 where an SEM mode is initiated.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents. For example, embodiments of the present invention in which a user manually establishes an asymmetric enhanced operation are contemplated. For example, a user may determine that a high frequency downlink requires redundant data transmission. In an embodiment of the present invention, a method for minimizing interference in a wireless communications device includes providing a means for a user or hardware provider to set a default operation condition for a handset and base station of a wireless system, such that redundant data transmission occurs during a downlink segment, and non-redundant (a data packet transmitted only once) data transmission occurs during an uplink segment.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for avoiding interference during operation of a wireless communications system, comprising:
   setting an interference threshold value based on an amount of periodic errors received over a communications link;
   measuring a timing of errors received over the communications link at regular intervals;
   comparing the timing of the received errors with respect to a phase of an AC power source that powers the communications system and a microwave source;
   determining that a segment B interferer comprising segment B radiation from the microwave source is present when a consistent timing of the received errors with respect to the phase of the AC power source is detected, wherein the segment B radiation comprises a pair of high-level bursts of energy that occur at a beginning and an end of a half cycle of the AC power source during which a magnetron of the microwave source is powered; and
   initiating an asymmetric enhanced mode operation in the wireless device, wherein during the asymmetric enhanced mode operation the communications link is configured for redundant data transmission in only a single direction of the communications link.

2. The method of claim 1, wherein the single direction comprises a downlink.

3. The method of claim 1, wherein the single direction comprises an uplink.

4. The method of claim 2, wherein the redundant transmission comprises a simplex bearer timeslot and a duplex bearer timeslot located in a downlink segment.

5. The method of claim 3, wherein the redundant transmission comprises a simplex bearer timeslot and a duplex bearer timeslot located in an uplink segment.

6. The method of claim 1, wherein a downlink comprises a 5.8 GHz frequency band and an uplink comprises a 2.4 GHz band.

7. The method of claim 1, wherein setting an interference threshold value further comprises storing the interference threshold value in a memory of the wireless communications system.

8. The method of claim 1, wherein setting an interference threshold value further comprises:
   setting an uplink threshold value; and
   setting a downlink threshold value.

9. The method of claim 1, wherein redundant data transmission takes place in response to a determination that a segment B interferer is present only on a link direction for which the consistent timing of the received errors with respect to the phase of the AC power source is detected.

10. A system for avoiding interference during wireless communications, comprising:
    a handset and base configured to communicate over a wireless link, the wireless link comprising at least one duplex bearer residing in an uplink portion and a down link portion of a (Time Division Multiple Access) (TDMA) frame structure;
    a plurality of transmission slots arranged in each of the uplink and downlink portions, each transmission slot configured to transmit a copy of a data packet;

a counter to count an amount of data transmission errors sent within a transmission slot;

a microcontroller unit configured to receive timing information concerning the data transmission errors, wherein the transmission errors are determined to be caused by a segment B interferer comprising segment B radiation from a microwave source when a consistent timing of the errors with respect to a phase of an AC power source that powers the microwave source and the base is detected, wherein the segment B radiation comprises a pair of high-level bursts of energy that occur at a beginning and an end of a half cycle of the AC power source during which a magnetron of the microwave source is powered; and a memory to store a set of predetermined thresholds including a threshold applicable to the segment B interferer, wherein an asymmetric enhanced mode (AEM) operation is initiated when the amount of data transmission errors within the transmission slot exceeds a first threshold of the set of predetermined thresholds.

11. The system of claim 10, wherein the TDMA frame structure comprises a Worldwide Digital Cordless Telecommunications (WDCT) frame structure.

12. The system of claim 10, wherein the AEM operation comprises:

connecting the handset and base over a first duplex bearer in a first link direction; and connecting the handset and base over a first simplex bearer in a second link direction, whereby redundant copies of data packets are sent in the second link direction, and single copies of data packets are sent in the first link direction.

13. The system of claim 12, further comprising a buffer that is serially incorporated into a Coder/Decoder (CODEC) input data path, wherein the redundant copies of the data packets sent in the second link direction are received before one copy of the redundant copies of data packets that is received without error is buffered into the CODEC for playback at a constant rate.

14. The system of claim 10, wherein a downlink from base to handset employs a 5.8 GHz band, and an uplink from handset to base employs a 2.4 GHz band.

15. The system of claim 10, wherein the set of predetermined thresholds comprises an uplink threshold and a downlink threshold.

16. The system of claim 10, wherein the counter counts an error number for transmitted data in each of the transmission slots of the uplink and downlink portions.

17. The system of claim 10, further comprising a means for manually setting a default AEM operation, wherein redundant data transmission occurs during the first link, and non-redundant data transmission occurs during a second link, when the default AEM operation is set.

* * * * *